US012503092B2

(12) United States Patent
Lee et al.

(10) Patent No.: US 12,503,092 B2
(45) Date of Patent: Dec. 23, 2025

(54) ELECTRONIC STABILITY CONTROL-BASED BRAKE ACTUATION WITH REDUNDANCY

(71) Applicant: BWI (Shanghai) Co., Ltd., Shanghai (CN)

(72) Inventors: Alan James Lee, South Lyon, MI (US); David Fredrick Reuter, Beavercreek, OH (US); Daniel Norbert Borgemenke, Springboro, OH (US)

(73) Assignee: BWI (Shanghai) Co., Ltd., Shanghai (CN)

( * ) Notice: Subject to any disclaimer, the term of this patent is extended or adjusted under 35 U.S.C. 154(b) by 419 days.

(21) Appl. No.: 18/072,213

(22) Filed: Nov. 30, 2022

(65) Prior Publication Data
US 2023/0174033 A1 Jun. 8, 2023

Related U.S. Application Data

(60) Provisional application No. 63/285,478, filed on Dec. 2, 2021.

(30) Foreign Application Priority Data

Nov. 24, 2022 (CN) .......................... 202211480020.4

(51) Int. Cl.
*B60T 13/68* (2006.01)
*B60T 8/40* (2006.01)
*B60T 8/50* (2006.01)

(52) U.S. Cl.
CPC .......... *B60T 8/5037* (2013.01); *B60T 8/4072* (2013.01); *B60T 13/686* (2013.01);
(Continued)

(58) Field of Classification Search
CPC ................ B60T 13/745; B60T 13/686; B60T 2270/402; B60T 2270/404;
(Continued)

(56) References Cited

U.S. PATENT DOCUMENTS 12,162,445 B2 * 12/2024 Weh ...................... B60T 13/745
2005/0134110 A1 6/2005 Reuter et al.
(Continued)

FOREIGN PATENT DOCUMENTS

CA 103950445 A 7/2014
CN 103373335 A 10/2013
(Continued)

OTHER PUBLICATIONS

First Office Action issued for corresponding Japanese Patent Application 2022-193122 issued on Jan. 9, 2024.
(Continued)

*Primary Examiner* — Bradley T King
(74) *Attorney, Agent, or Firm* — William H. Honaker; Dickinson Wright PLLC (57) ABSTRACT

A brake system comprises an electronic stability control (ESC) module defining a first interconnect passage, and a pressure supply unit (PSU) module defining a second interconnect passage in fluid communication with the first interconnect passage. The ESC module includes a first pump configured to transfer brake fluid from the PSU module and to a plurality of wheel brakes, and a prime valve configured to selectively control fluid communication between the first interconnect passage and an inlet of the first pump. The PSU module includes a second pump configured to transfer the brake fluid from a fluid reservoir to the first interconnect passage, and a bypass fluid passage from the fluid reservoir to the ESC module with an inline check valve allowing fluid flow through the bypass fluid passage from the fluid reser- (Continued)

voir and to the ESC module while blocking fluid flow in an opposite direction.

18 Claims, 7 Drawing Sheets

(52) U.S. Cl.
 CPC ... *B60T 2270/306* (2013.01); *B60T 2270/402* (2013.01); *B60T 2270/404* (2013.01)

(58) Field of Classification Search
 CPC ......... B60T 2270/413; B60T 2270/604; B60T 2201/02; B60T 2201/022; B60T 2201/024
 See application file for complete search history.

(56) References Cited

U.S. PATENT DOCUMENTS

| | | | |
|---|---|---|---|
| 2007/0007817 A1* | 1/2007 | Nonaga | B60T 13/746 303/155 |
| 2011/0168502 A1 | 7/2011 | Linhoff et al. | |
| 2011/0226569 A1* | 9/2011 | Devlieg | B60T 8/1703 188/158 |
| 2012/0212043 A1* | 8/2012 | Miyata | B60T 7/042 303/9.62 |
| 2012/0299367 A1* | 11/2012 | Ross | B60T 8/4872 303/3 |
| 2013/0277156 A1 | 10/2013 | Yang et al. | |
| 2014/0152085 A1 | 6/2014 | Biller et al. | |
| 2015/0166028 A1* | 6/2015 | Kim | B60T 8/4081 303/10 |
| 2015/0217741 A1 | 8/2015 | Kikawa et al. | |
| 2016/0263999 A1* | 9/2016 | Parga-Cacheiro | B60L 15/2054 |
| 2016/0332609 A1* | 11/2016 | Glaser | B60T 8/17555 |
| 2017/0072920 A1* | 3/2017 | Besier | B60T 8/4081 |
| 2017/0129469 A1 | 5/2017 | Besier et al. | |
| 2018/0079313 A1* | 3/2018 | Foitzik | B60T 13/741 |
| 2018/0257622 A1* | 9/2018 | Saito | B60T 13/662 |
| 2019/0016321 A1* | 1/2019 | Dinkel | B60T 8/4081 |
| 2019/0039579 A1* | 2/2019 | Ohkubo | B60L 7/26 |
| 2019/0299786 A1 | 10/2019 | Nakagawa et al. | |
| 2021/0221345 A1* | 7/2021 | Maruo | B60T 7/042 |
| 2021/0309197 A1* | 10/2021 | Weh | B60T 8/368 |
| 2022/0166292 A1* | 5/2022 | Leiter | H02K 11/33 |
| 2022/0324430 A1* | 10/2022 | Watanabe | B60T 11/26 |
| 2023/0053950 A1* | 2/2023 | Leiber | B60T 8/1764 |
| 2023/0192062 A1* | 6/2023 | Marx | B60T 13/662 303/6.01 |
| 2023/0249807 A1* | 8/2023 | Georgin | B64C 25/44 701/70 |
| 2023/0256953 A1* | 8/2023 | Weh | B60T 17/02 137/597 |
| 2024/0101081 A1* | 3/2024 | Yuan | B60W 60/0015 |
| 2024/0132039 A1* | 4/2024 | Yang | B60T 8/4081 |
| 2024/0166180 A1* | 5/2024 | Weh | B60T 13/745 |
| 2024/0359669 A1* | 10/2024 | Zhang | B60T 13/142 |
| 2025/0001987 A1* | 1/2025 | Leiber | B60W 10/20 |
| 2025/0042381 A1* | 2/2025 | Courth | B60T 13/166 |
| 2025/0042382 A1* | 2/2025 | Reuter | B60T 8/172 |

FOREIGN PATENT DOCUMENTS

| | | | |
|---|---|---|---|
| CN | 106891878 A | 6/2017 | |
| CN | 111512060 A | 8/2020 | |
| CN | 112406830 A | 2/2021 | |
| DE | 102019106274 A1 | 9/2020 | |
| JP | 2011006027 A | 1/2011 | |
| JP | 2018090110 A | 6/2018 | |
| JP | 2018095023 A | 6/2018 | |
| JP | 2019006299 A | 1/2019 | |
| WO | WO-2015032637 A1 * | 3/2015 | ............ B60T 8/4081 |

OTHER PUBLICATIONS

Extended European search report issued on Apr. 6, 2023 for counterpart EP patent application No. EP22210564.5 (Five Page).
Second Office Action issued for corresponding Japanese Patent Application 2022-193122 issued on Jul. 30, 2024.
The Supplementary Search report issued on Jul. 29, 2025 for counterpart Chinese patent application No. 2022114800204, along with machine EN translation (4 Pages).

* cited by examiner

FIG. 7

ELECTRONIC STABILITY CONTROL-BASED BRAKE ACTUATION WITH REDUNDANCY

CROSS REFERENCE TO RELATED APPLICATIONS

This U.S. utility patent application claims the benefit of U.S. Provisional Patent Application No. 63/285,478, filed Dec. 2, 2021, the contents of which is incorporated herein by reference in its entirety.

BACKGROUND OF THE INVENTION

1. Field of the Invention

The present disclosure relates generally to brake systems for vehicles, such as automobiles. More specifically, the present disclosure relates to a brake system that may be used with Level 4 autonomous driving.

2. Description of the Prior Art

Autonomous vehicles need to provide braking without driver input. Typically, these solutions are provided by one box braking system that provide brake apply (actuation) and brake modulation (ABS/ESC) all architected within one hardware box. An additional brake unit is either integrated within the one box or added separately to provide redundancy for brake apply and possibly for the brake modulation (ABS/ESC). These types of systems are very capable but can be quite expensive.

SUMMARY OF THE INVENTION

The present invention provides a brake system for a motor vehicle. The brake system comprises two brake related modules, an electronic stability control (ESC) module defining a first interconnect passage, and a pressure supply unit (PSU) module defining a second interconnect passage in fluid communication with the first interconnect passage of the ESC module. The ESC module includes a first pump configured to transfer brake fluid from the PSU module and to a plurality of wheel brakes, and a prime valve configured to selectively control fluid communication between the first interconnect passage and an inlet of the first pump. The PSU module includes a second pump configured to transfer the brake fluid from a fluid reservoir to the first interconnect passage of the ESC module, and a bypass fluid passage with an inline check valve. The bypass fluid passage is configured to convey the brake fluid directly from the fluid reservoir to the ESC module and to bypass the second pump. The inline check valve is configured to allow fluid flow through the bypass fluid passage from the fluid reservoir and to the ESC module while blocking fluid flow in an opposite direction.

The present invention also provides a brake system for a motor vehicle. The brake system comprises an electronic stability control (ESC) module defining a first interconnect passage, and a pressure supply unit (PSU) module defining a second interconnect passage in fluid communication with the first interconnect passage of the ESC module. The ESC module includes a first electronic control unit (ECU) and a first pump configured to transfer brake fluid from the PSU module and to a plurality of wheel brakes. The PSU module includes a second ECU and a second pump configured to transfer the brake fluid from a fluid reservoir to the first interconnect passage of the ESC module, and a bypass fluid passage with an inline check valve. The bypass fluid passage is configured to convey the brake fluid directly from the fluid reservoir to the ESC module and bypassing the second pump. The inline check valve is configured to allow fluid flow through the bypass fluid passage from the fluid reservoir and to the ESC module while blocking fluid flow in an opposite direction.

BRIEF DESCRIPTION OF THE DRAWINGS

Other advantages of the present invention will be readily appreciated, as the same becomes better understood by reference to the following detailed description when considered in connection with the accompanying drawings wherein.

DESCRIPTION OF THE ENABLING EMBODIMENT

Referring to the drawings, the present invention will be described in detail in view of following embodiments.

The system of the present disclosure may be suitable for Level 4 or greater automation based on the "Levels of Driving Automation" standard by SAE International that defines six levels of driving automation, as specified in SAE standard J3016. Level 4 automation provides for a vehicle to be fully autonomous (i.e., no driver required) but may be restricted to speed and area of operation. This type of vehicle may include a shuttle that moves around in a prescribed area at some maximum speed carrying either passengers or packages.

The brake systems of the present disclosure may interact with an autonomous driving controller and software stack which may command via CAN messaging or alternate bus messaging to the braking units to perform the level of braking as required.

The present disclosure provides for service braking to be performed by two off the shelf Electronic Stability Control (ESC) units, with one so modified as to become a specialized Pressure Supply Unit (PSU), architected in a fashion to provide redundancy. An additional benefit also provided in this dual module approach is distributed EPB (Electric Park Brake) control that also provides continued EPB functionality in the event of an ECU (electronic control unit) failure that drives the electric park brakes.

The brake systems of the present disclosure may include one completely standard 12-valve ESC unit and one PSU unit to provide both redundant brake actuation and to provide standard ABS/ESC within an economical two box package. Actuation redundancy is provided by one ESC unit and one PSU unit in series. ABS/ESC Modulation is provided by the ESC unit. Each unit can provide brake actuation. In some embodiments, the typical brake actuation functions alternate between each unit on each brake apply. This would allow the wear of the units to be spread evenly between them.

Figure 1:
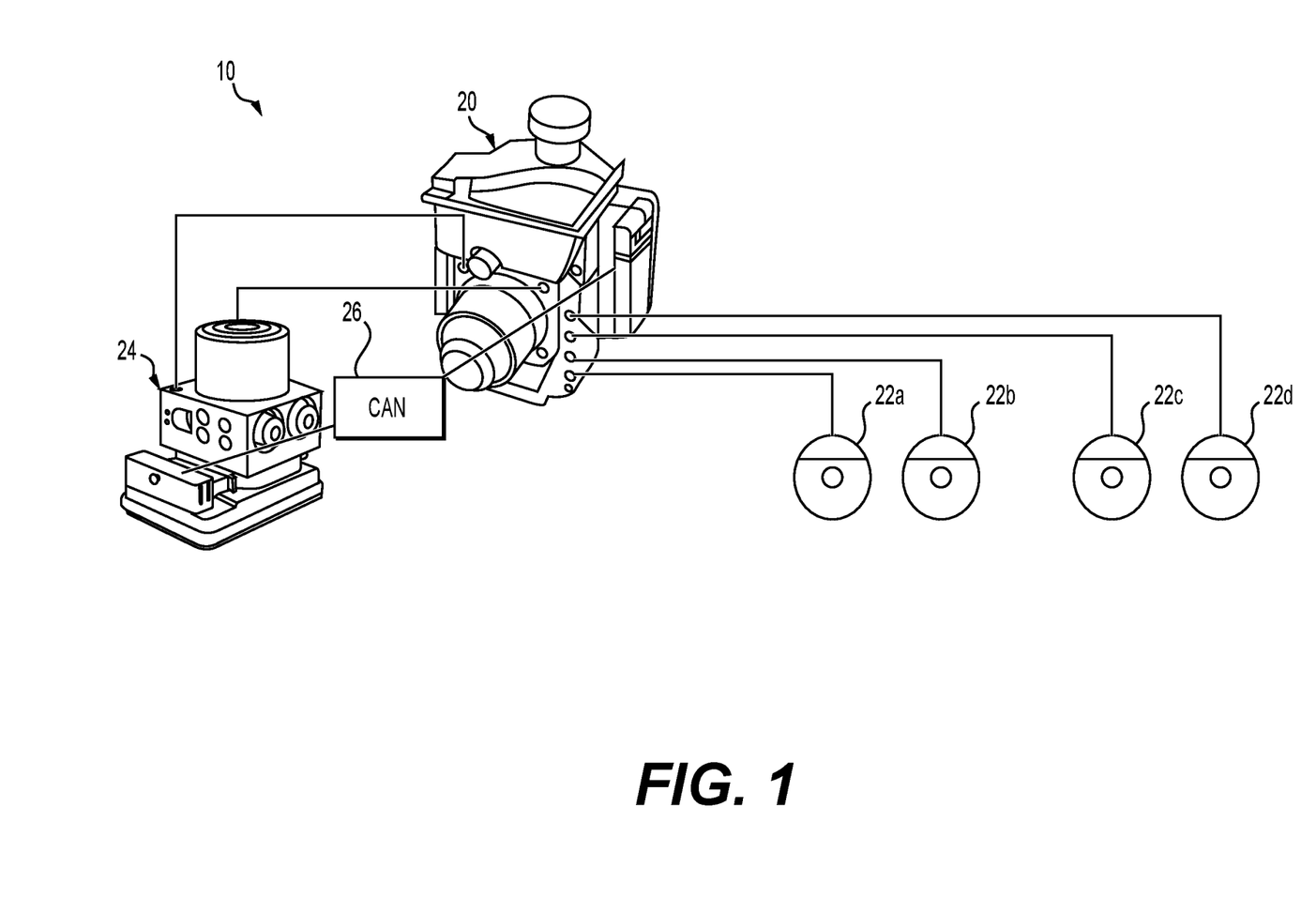
FIG. 1 shows a schematic diagram of a first brake system according to an aspect of the present disclosure.

FIG. 1 shows a schematic diagram of a first brake system 10 according to an aspect of the present disclosure. The first brake system 10 is configured to provide redundant braking operation which is required for Level 4 or greater automation. The first brake system 10 includes a primary Electric-Hydraulic Control Unit (EHCU) 20 hydraulically connected to four wheel brakes 22a, 22b, 22c, 22d. The primary EHCU 20 may be a full-function device, including ability to generate fluid pressure for applying each of the wheel brakes 22a, 22b, 22c, 22d and for controlling distribution of the fluid to provide functions such as anti-lock braking, electronic stability control, etc. The wheel brakes 22a, 22b, 22c, 22d may each be connected to a corresponding wheel (not shown) of a vehicle and may also be called foundation brakes for function in stopping the vehicle. A fallback EHCU 24 is hydraulically coupled to the primary EHCU 20 to provide fluid for operating the wheel brakes 22a, 22b, 22c, 22d in case the primary EHCU 20 is unavailable. The fallback EHCU 24 is also in communication with the primary EHCU 20 via a Controller Area Network (CAN) interconnection 26. However, other communications interfaces may be used.

The first brake system 10 could work well but the cost of the primary EHCU 20 is very high due to the incorporation of such components as a brushless motor, ball screw, and corresponding controls needed to make the system function correctly. This type of unit has very fast response time, which in many cases for some Level 4 applications where speed limits are constrained, that are much faster than required.

Figure 2:
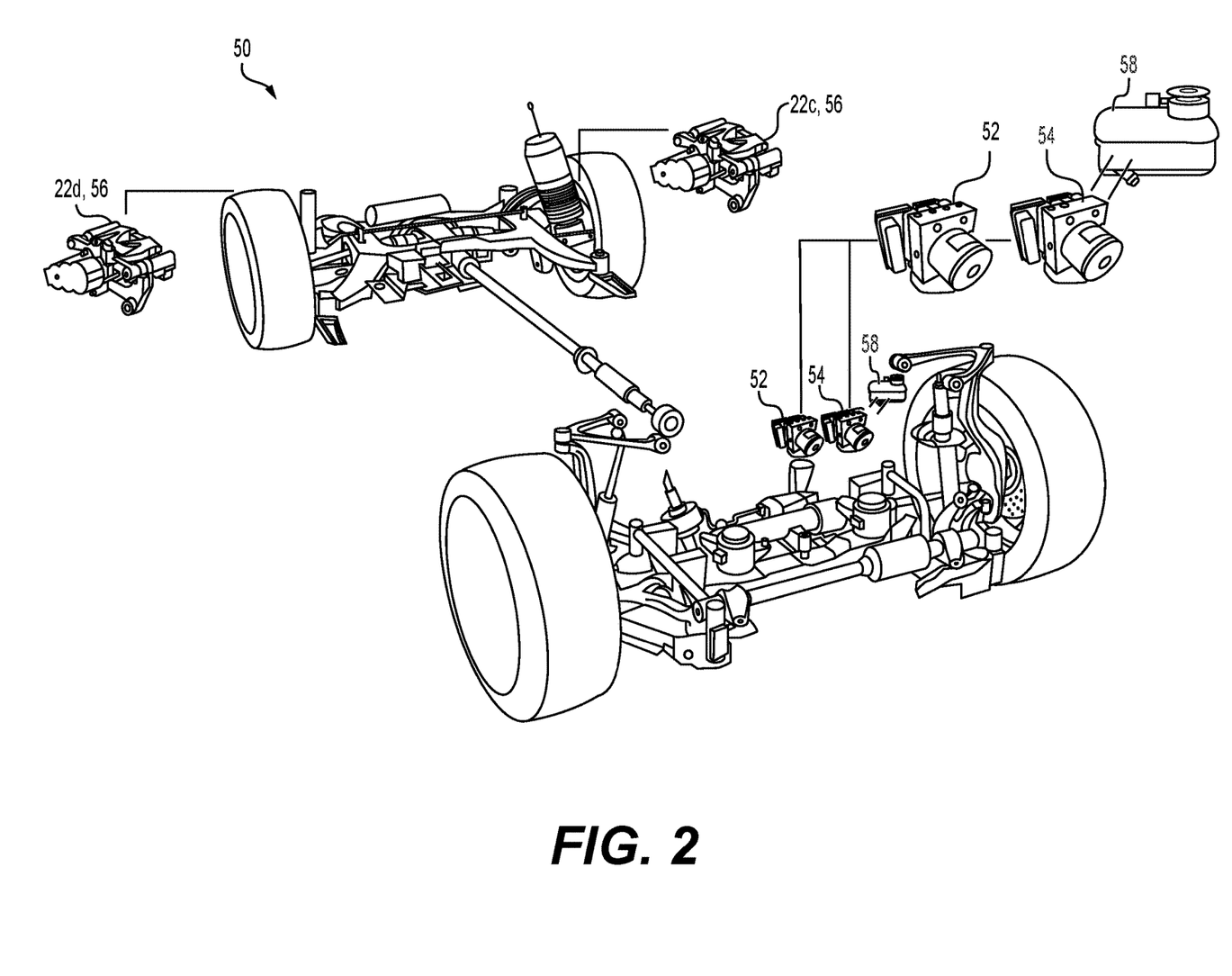
FIG. 2 shows a schematic diagram of a second brake system according to an aspect of the present disclosure.

FIG. 2 shows a schematic diagram of a second brake system 50 according to an aspect of the present disclosure. The second brake system 50 is also configured to provide redundant braking operation which is required for Level 4 or greater automation. The second brake system 50 may provide cost advantages over the first brake system 10. The second brake system 50 includes an electronic stability Control (ESC) module 52 and a PSU module 54 that is packaged similar to the ESC module 52 and shares common components. The ESC module 52 and the PSU module 54 may be derived from a same basic ESC design package to save manufacturing costs. The ESC module 52 may be a fully functional ESC, while the PSU module 54 may be primarily used for fallback and base brake applies. If autonomous braking is required at any speed, either one of the modules 52, 54 can provide the braking. The reservoir 58 stores fluid to be used directly by the PSU module 54 or indirectly by the ESC module 52.

Each of the modules 52, 54 may include a pump driven by an electric motor and one or more solenoid valves to control distribution of pressurized fluid for operating the wheel brakes 22a, 22b, 22c, 22d. The ESC module 52 and PSU module 54 may be configured as an integrated package including the pump and corresponding motor, an electronic control unit (ECU), and a hydraulic control unit (HCU) including the valves with associated fluid passages and hydraulic fittings for distributing brake fluid to operate the wheel brakes 22a, 22b, 22c, 22d. The ESC 52 module and the PSU module 54 may be housed in nearly identical appearing modules such as a DBC 1280 ESC device. The second brake system 50 may also utilize regenerative braking, particularly at higher speeds.

The second brake system 50 also includes two rear wheel brakes 22c, 22d of the wheel brakes 22a, 22b, 22c, 22d configured with an electric parking brake (EPB) caliper 56. Such EPB calipers 56 each include an electric actuator that is configured to apply the brake, in addition to or instead of by hydraulic application. In other words, each of the EPB calipers 56 may provide braking force in response to either or both of an electrical signal and/or a hydraulic brake pressure supply. Alternatively or additionally, the two front wheel brakes 22c, 22d of the wheel brakes 22a, 22b, 22c, 22d may be configured with EPB calipers 56. In some embodiments, each the of the ESC modules 52, 54 may be configured to control one or more of the EPB calipers 56. For example, the ECU in module 52 may control one of the two EPB calipers 56 in the right rear wheel brake 22c and the ECU in module 54 may control the other EPB caliper 56 in the left rear wheel brake 22d. Such a configuration may provide enhanced safety and/or redundancy in case of ECU failure.

Figure 3:
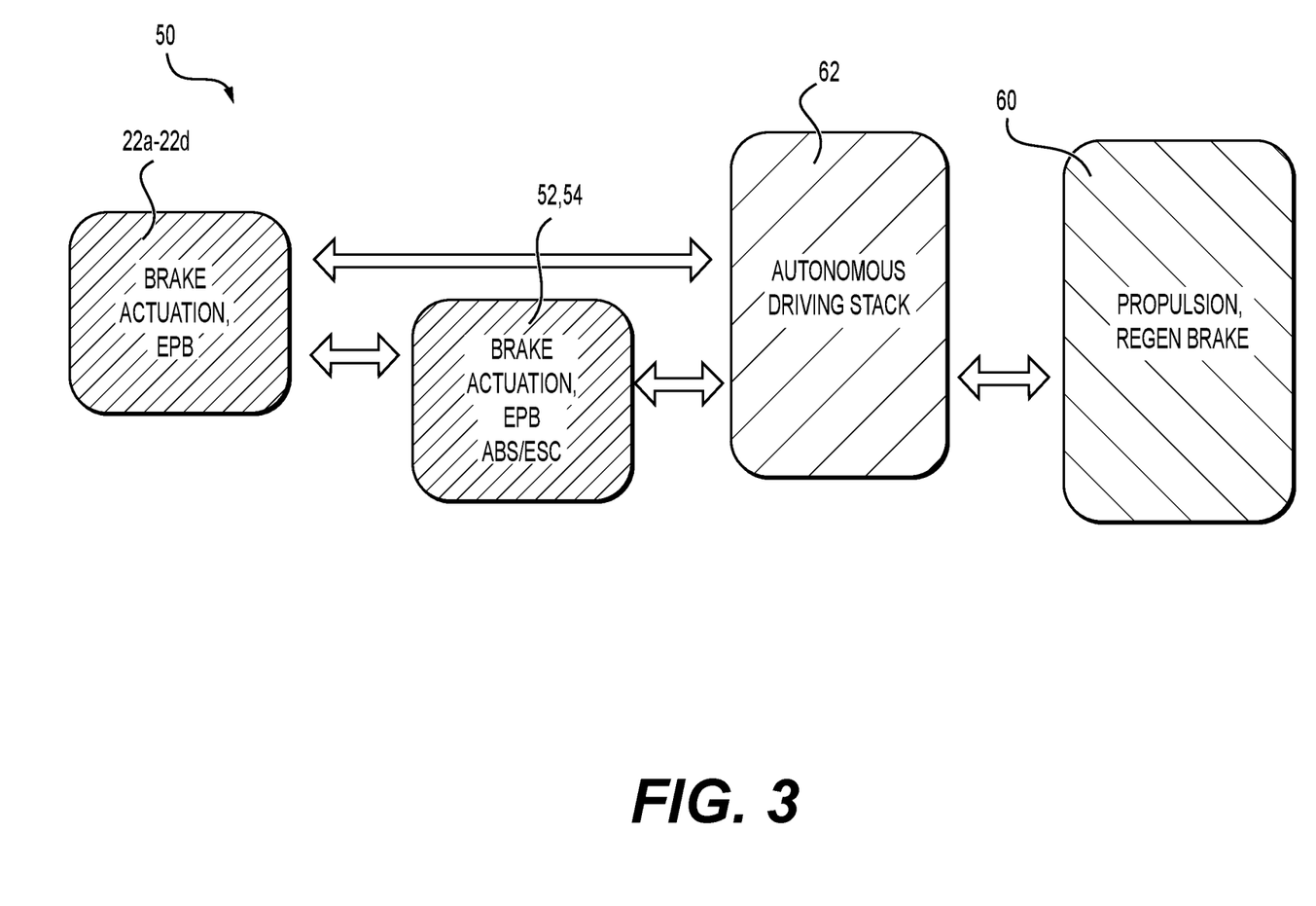
FIG. 3 shows a schematic block diagram showing functional interconnections between vehicle systems including the second brake system.

FIG. 3 shows a schematic block diagram showing functional interconnections between vehicle systems including the second brake system 50. FIG. 3 shows a vehicle that includes a propulsion subsystem 60 that may also provide regenerative (regen) braking functions. The propulsion subsystem 60 may include one or more electric machines, such as motor/generators. The propulsion subsystem 60 may include other associated devices, such as inverters, electronic control units, batteries, etc. FIG. 3 also shows an Autonomous Driving (AD) electronic control unit (ECU) 62 that provides an AD stack in functional communication with each of the propulsion subsystem 60 and the second brake system 50. The AD ECU 62 may include hardware and/or software configured to coordinate autonomous driving functions of the vehicle. The AD ECU 62 may be in charge of propulsion and braking. The AD ECU 62 may control regenerative braking, which may include a majority of the braking above a predetermined speed. Below the predetermined speed, the ECUs 80, 180 of the ESC modules 52, 54 of the second brake system 50 may control braking to a standstill.

The ESC module 52 and PSU module 54 of the second brake system 50 may be actuated to slow the vehicle or bring the vehicle to a standstill condition and may function as follows:

The ESC module 52 and PSU module 54 each include a corresponding brake modulator. Either or both of the brake modulators can apply the wheel brakes 22a, 22b, 22c, 22d to provide redundant braking. The brake modulator may include a pump to provide brake fluid for applying the wheel brakes 22a, 22b, 22c, 22d. The ESC module 52 and PSU module 54 may alternate brake apply duties to balance wear therebetween. In some embodiments, automatic emergency braking (AEB), anti-lock brakes (ABS), Dynamic Rear Proportioning (DRP) used to maintain front to rear brake balance, and/or electronic stability control (ESC) functions may be handled by either the ESC module 52 or the PSU module 56. The runtime of the pumps in the ESC module 52 and PSU module 54 may be recorded and reported for maintenance.

Figure 4:
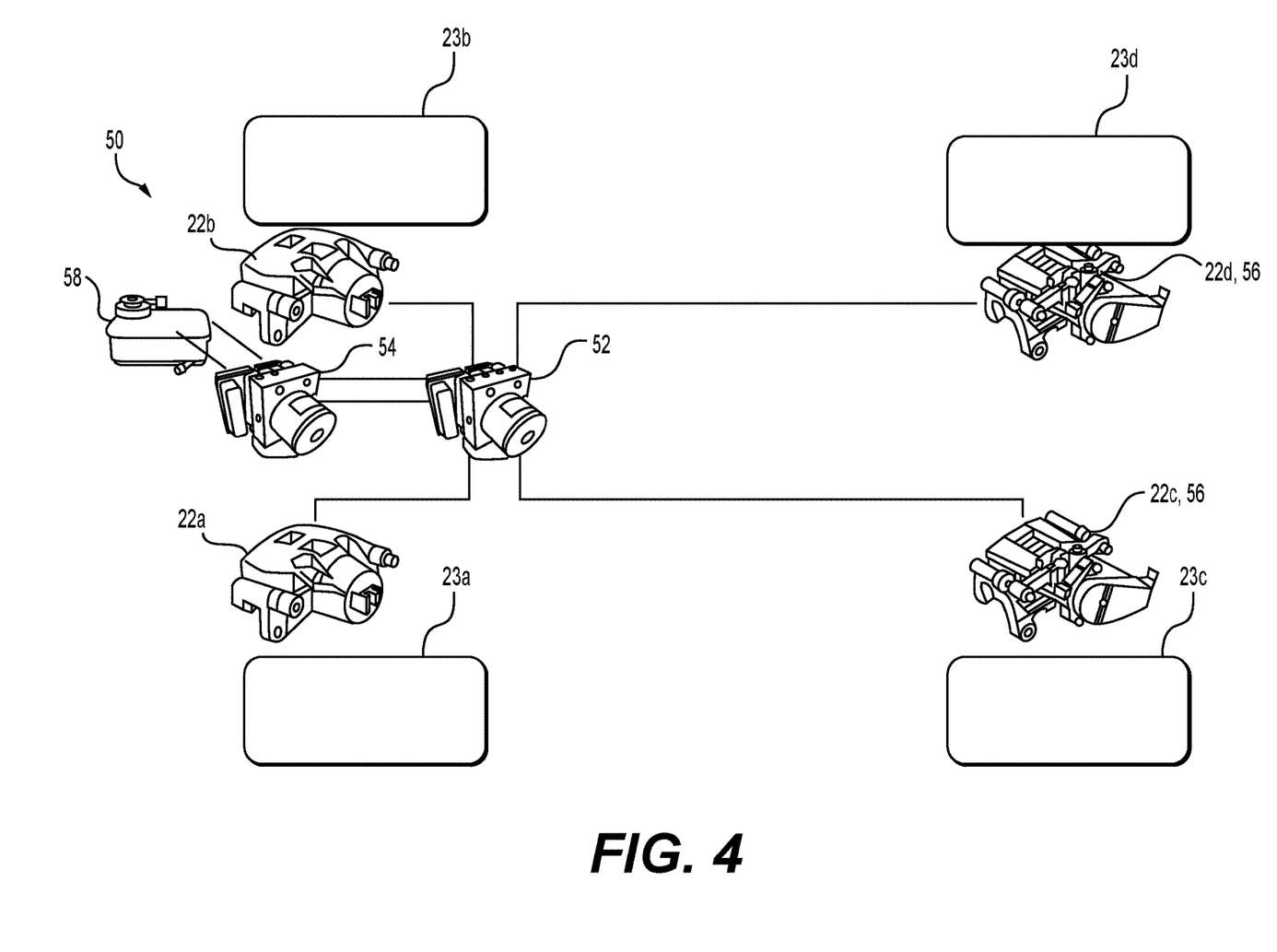
FIG. 4 shows a schematic block diagram showing hydraulic interconnections of the second brake system.

FIG. 4 shows a schematic block diagram showing hydraulic interconnections of the second brake system 50. As shown in FIG. 4, each of the wheel brakes 22a, 22b, 22c, 22d is connected to a corresponding wheel 23a-23d for applying a braking force thereto. A fluid reservoir 58 is connected to the PSU module 54 for supplying brake fluid thereto.

Figure 6:
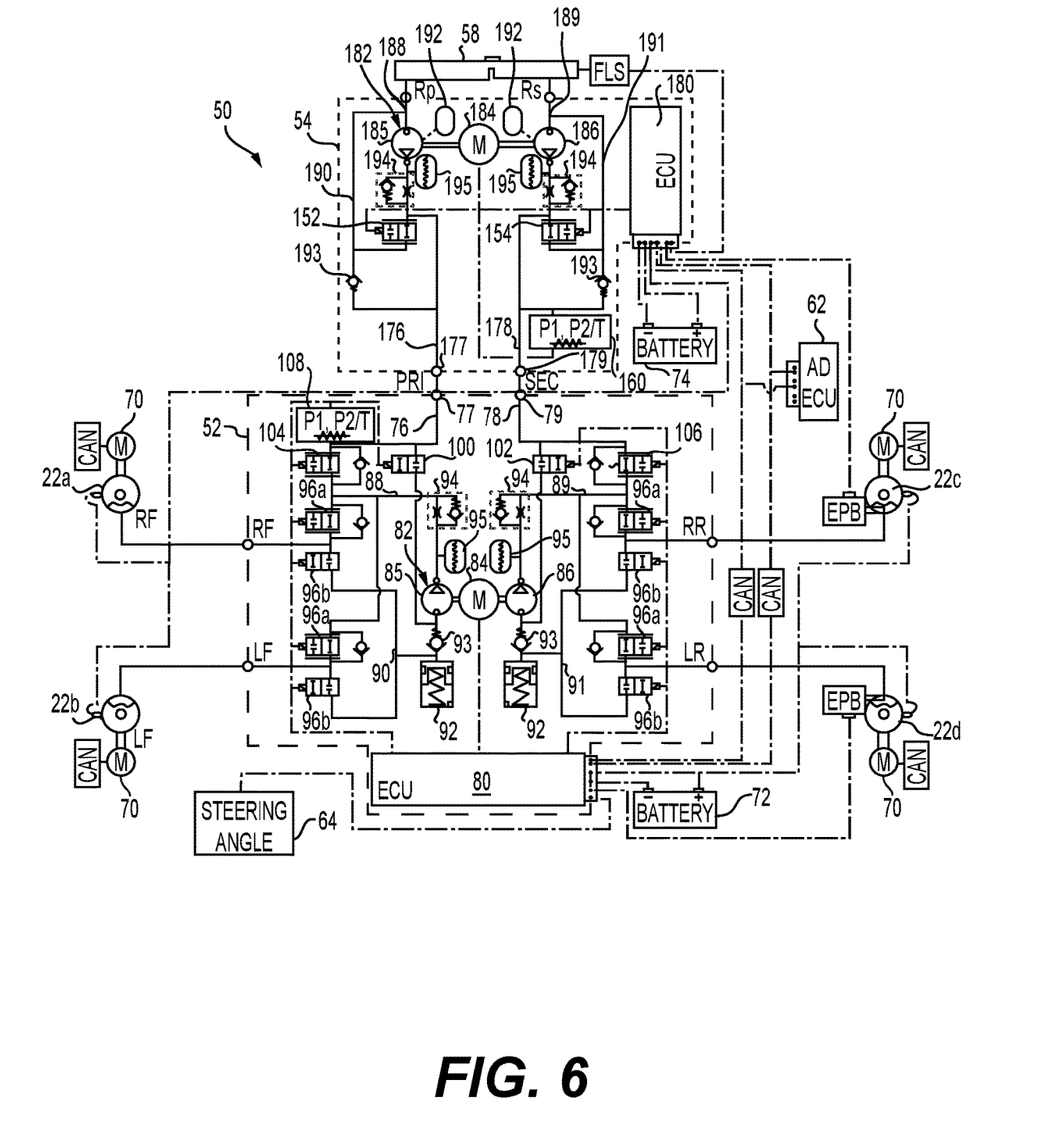
FIG. 6 shows a schematic diagram of the second brake system, according to an aspect of the present disclosure.

As also shown on FIG. 6, each of the rear wheel brakes 22c, 22d includes an electric parking brake EPB. The electric parking brake EPB of the right-rear wheel brake 22c is electrically connected to the second brake ECU 180, and the electric parking brake EPB of the left-rear wheel brake 22d is electrically connected to the first brake ECU 80. This arrangement provides redundancy for the electric parking brakes EPB in case either of the brake ECUs 80, 180 loses power or is otherwise unavailable.

Figure 5:
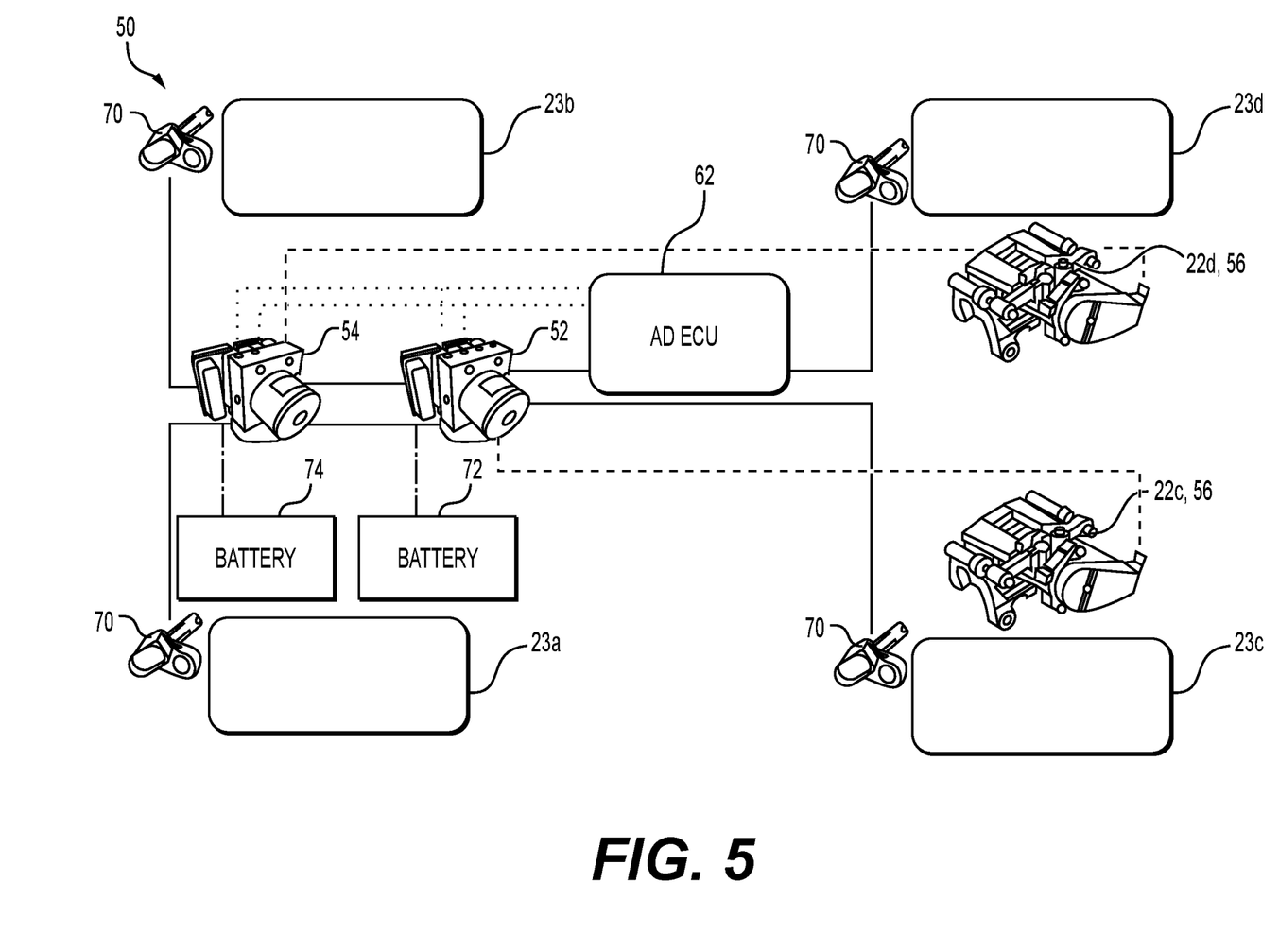
FIG. 5 shows a schematic block diagram showing electrical interconnections of the second brake system.

FIG. 5 shows a schematic block diagram showing electrical interconnections of the second brake system 50. As shown in FIG. 5, each of the wheels 23a-23d is connected to a corresponding wheel speed sensor 70a-70d for measuring a rotational speed of the wheels. The front wheel speed sensors 70a, 70b are connected to the first brake ECU 80. The rear wheel speed sensors 70c, 70d are connected to the second brake ECU 180. This arrangement provides redundancy for the wheel speed sensors 70a, 70b, and 70c, 70d in case either of the brake ECUs 80, 180 loses power or is otherwise unavailable. The first brake ECU 80 and the second brake ECU 180 are both functionally connected to the AD ECU 62. A first power source, such as a first battery 72, is connected to the ESC module 52 for providing backup power thereto, and a second power source, such as a second battery 74, is connected to the PSU module 54 for providing backup power thereto. In this way, the ESC module 52 and the PSU module 54 each has a separate and independent backup power supply.

FIG. 6 shows a schematic diagram of the second brake system 50, showing details of each of the ESC module 52 and the PSU module 54 and their interconnections. Each of the modules has two separate and independent brake circuits, with associated components designated as primary and secondary. The separate and independent brake circuits may each be operated under normal conditions and may provide redundancy. For example, either of the brake circuits may provide braking function even in case of a major failure, such as a large fluid leak, in the other one of the brake circuits.

As shown in FIG. 6, the ESC module 52 includes a first primary interconnect passage 76 with a corresponding primary inlet port 77, and a first secondary interconnect passage 78 with a corresponding secondary inlet port 79. The ESC module 52 also includes a first brake ECU 80 and a first pump 82 having a first motor 84 controlled by the first brake ECU 80. For example, the first brake ECU 80 may supply a control power, such as a pulse-width-modulated (PWM) alternating current power to the first motor 84 for controlling a speed of the first motor 84. The first pump 82 also includes a first primary pump element 85 and a first secondary pump element 86 each coupled to the first motor 84 for supplying fluid through the corresponding brake circuit. A steering angle sensor 64 is in functional communication with the first brake ECU 80 to communicate steering angle data thereto. The first brake ECU 80 may use the steering angle data and/or other vehicle data for adjusting one or more parameters related to operation of the brakes.

The ESC module 52 includes a primary supply fluid passage 88 configured to convey fluid from the first primary pump element 85 of the first pump 82 to two of the wheel brakes 22a, 22b. The ESC module 52 also includes a secondary supply fluid passage 89 configured to convey fluid from the first secondary pump element 86 of the first pump 82 to the other two of the wheel brakes 22c, 22d. The ESC module 52 includes a primary return fluid passage 90 configured to convey fluid from the corresponding wheel brakes 22a, 22b and to the first primary pump element 85 of the first pump 82. The ESC module 52 also includes a secondary return fluid passage 91 configured to convey fluid from the corresponding wheel brakes 22c, 22d and to the first secondary pump element 86 of the first pump 82.

An accumulator 92 is coupled to each of the return fluid passages 90, 91 for holding fluid from the corresponding ones of the wheel brakes 22a, 22b, 22c, 22d and supplying the fluid to the corresponding pump elements 85, 86. Each of the accumulators 92 may include a piston that is displaceable in a bore and biased by a spring to hold the fluid therein. However, either or both of the accumulators 92 may have a different configuration. A return check valve 93 is disposed between each of the each of the return fluid passages 90, 91 and the corresponding one of the first pump elements 85, 86 for allowing fluid flow from the return fluid passage 90, 91 to the corresponding one of the first pump elements 85, 86 while blocking fluid flow in an opposite direction.

The ESC module 52 also includes a first noise damper 94 disposed between an outlet of each of the first pump elements 85, 86 and the corresponding supply fluid passage 88, 89. Each of the first noise dampers 94 includes a restrictor orifice connected to the outlet of the corresponding first pump element 85, 86, and a blow-off valve in parallel with the restrictor orifice to permit flow restrictions at low hydraulic flow conditions and unrestricted hydraulic flow at high flow restriction. The ESC module 52 also includes an elastomeric damper 95 connected to the outlet of each of the first pump element 85, 86 to reduce pulsing in the pressure of the fluid supplied therefrom and to further reduce noise.

The ESC module 52 includes an apply valve 96a and a relief valve 96b associated with each of the wheel brakes 22a, 22b, 22c, 22d for controlling fluid flow to and from the wheel brakes 22a, 22b, 22c, 22d. The apply valves 96a are each configured to control fluid flow from a corresponding one of the supply fluid passages 88, 89 and to a corresponding one of the wheel brakes 22a, 22b, 22c, 22d. The relief valves 96b are each configured to control fluid flow from a corresponding one of the wheel brakes 22a, 22b, 22c, 22d and to a corresponding one of the supply fluid passages 88, 89 and to a corresponding one of the return fluid passages 96, 91.

The ESC module 52 also includes a primary prime valve 100 that is configured to selectively control fluid communication between the first primary interconnect passage 76 and the inlet of the first primary pump element 85 of the first pump 82. The ESC module 52 also includes a secondary prime valve 102 that is configured to selectively control fluid communication between the first secondary interconnect passage 78 and the inlet of the first secondary pump element 86 of the first pump 82. Each of the prime valves 100, 102 may be normally-closed solenoid valves.

The ESC module 52 also includes a first primary pressure control valve 104 that is hydraulically connected between the between the first primary interconnect passage 76 and the primary supply fluid passage 88 for regulating a fluid pressure in the first primary interconnect passage 76. The ESC module 52 also includes a first secondary pressure control valve 106 that is hydraulically connected between the between the first secondary interconnect passage 78 and the secondary supply fluid passage 89 for regulating a fluid pressure in the first secondary interconnect passage 78. Each of the first pressure control valves 104, 106 may be a normally-open linear isolation valve that is capable of variable control of pressure thereacross. The ESC module 52 also includes a first pressure sensor 108 that is configured to monitor a fluid pressure in the first primary interconnect passage 76 and which is connected to the first brake ECU 80 for communicating the measured pressure thereto.

As shown in FIG. 6, the PSU module 54 includes a second primary interconnect passage 176 with a corresponding primary outlet port 177 that is fluidly coupled to the primary inlet port 77 of the ESC module 52 for supplying fluid thereto. The PSU module 54 also includes a second secondary interconnect passage 178 with a corresponding secondary outlet port 179 that is fluidly coupled to the secondary inlet port 79 of the PSU module 54 for supplying fluid thereto. The PSU module 54 also includes a second brake ECU 180 and a second pump 182 having a second motor 184 controlled by the second brake ECU 180. For example, the second brake ECU 180 may supply a control power, such as a pulse-width-modulated (PWM) alternating current power to the second motor 184 for controlling a speed of the second motor 184. The second pump 182 also includes a second primary pump element 185 and a second secondary pump element 186 each coupled to the second motor 184 for supplying fluid through a corresponding brake circuit. The second primary pump element 185 is configured to transfer brake fluid from the fluid reservoir 58 to first primary interconnect passage 76 of the ESC module 52 via the second primary interconnect passage 176. The second secondary pump element 186 is configured to transfer brake fluid from the fluid reservoir 58 to the first secondary interconnect passage 78 of the ESC module 52 via the second secondary interconnect passage 178.

The PSU module 54 includes a primary reservoir fluid passage 188 configured to convey fluid from the fluid reservoir 58 to the second primary pump element 185 of the second pump 182 via a primary reservoir port Rp. The PSU module 54 also includes a secondary reservoir fluid passage 189 configured to convey fluid from the fluid reservoir 58 to the second secondary pump element 186 of the second pump 182 via a secondary reservoir port Rs. The PSU module 54 includes a primary bypass fluid passage 190 providing fluid communication between the primary reservoir fluid passage 188 and the second primary interconnect passage 176 for conveying brake fluid directly from the fluid reservoir 58 to the ESC module 52 and bypassing the second pump 182. The PSU module 54 includes a secondary bypass fluid passage 191 providing fluid communication between the secondary reservoir fluid passage 189 and the second secondary interconnect passage 178 for conveying brake fluid directly from the fluid reservoir 58 to the ESC module 52 and bypassing the second pump 182. An inline check valve 193 is located in a fluid path between each of the second interconnect passages 176, 178 and a corresponding one of the bypass fluid passages 190, 191. Each of the inline check valves 193 is configured to allow fluid flow through the corresponding one of the bypass fluid passages 190, 191 from the fluid reservoir 58 and to the ESC module 52 via a corresponding one of the second interconnect passages 176, 178, while blocking fluid flow in an opposite direction. Each of the inline check valves 193 may have a low blow-off pressure allowing fluid flow therethrough only with predetermined fluid pressure thereacross, which may be a relatively low pressure.

An accumulator 192, which may be formed as a cavity in a body of the PSU module 54, is coupled to each of the second pump elements 185, 186 of the second pump 182. The PSU module 54 also includes a second noise damper 194 disposed between an outlet of each of the second pump elements 185, 186 and the corresponding one of the second interconnect passages 176, 178. Each of the second noise dampers 194 includes a restrictor orifice connected to the outlet of the corresponding one of the second pump elements 185, 186, and a blow-off valve in parallel with the restrictor orifice to permit flow restrictions at low hydraulic flow conditions and unrestricted hydraulic flow at high flow restriction. The PSU module 54 also includes a second elastomeric damper 195 connected to the outlet of each of the second pump elements 185, 186 of the second pump 182 to reduce pulsing in the pressure of the fluid supplied therefrom and to further reduce noise.

The PSU module 54 also includes a second primary pressure control valve 152 controlling fluid flow between the second primary interconnect passage 176 and the primary bypass fluid passage 190. The second brake ECU 180 may supply a control signal to the second primary pressure control valve 152 to regulate a fluid pressure in the first primary interconnect passage 76. The PSU module 54 also includes a second secondary pressure control valve 154 controlling fluid flow between the second secondary interconnect passage 178 and the secondary bypass fluid passage 191. The second brake ECU 180 may supply a control signal to the second primary pressure control valve 152 to regulate a fluid pressure in the second secondary interconnect passage 178 and to thereby also regulate the fluid pressure in the first secondary interconnect passage 78 of the ESC module 52. Each of the second pressure control valves 152, 154 may be a normally-open linear isolation valve that is capable of variable control of flow therethrough and/or pressure thereacross.

The PSU module 54 also includes a second pressure sensor 160 that is configured to monitor a fluid pressure in the second secondary interconnect passage 178 and which is connected to the second brake ECU 180 for communicating the measured pressure thereto.

As also shown on FIG. 6, each of the rear wheel brakes 22c, 22d includes an electric parking brake EPB. The electric parking brake EPB of the right-rear wheel brake 22c is electrically connected to the second brake ECU 180, and the electric parking brake EPB of the left-rear wheel brake 22d is electrically connected to the first brake ECU 80. This arrangement provides redundancy for the electric parking brakes EPB in case either of the brake ECUs 80, 180 loses power or is otherwise unavailable. Alternatively, or additionally, the front wheel brakes 22a, 22b may include electric parking brakes EPB.

Figure 7:
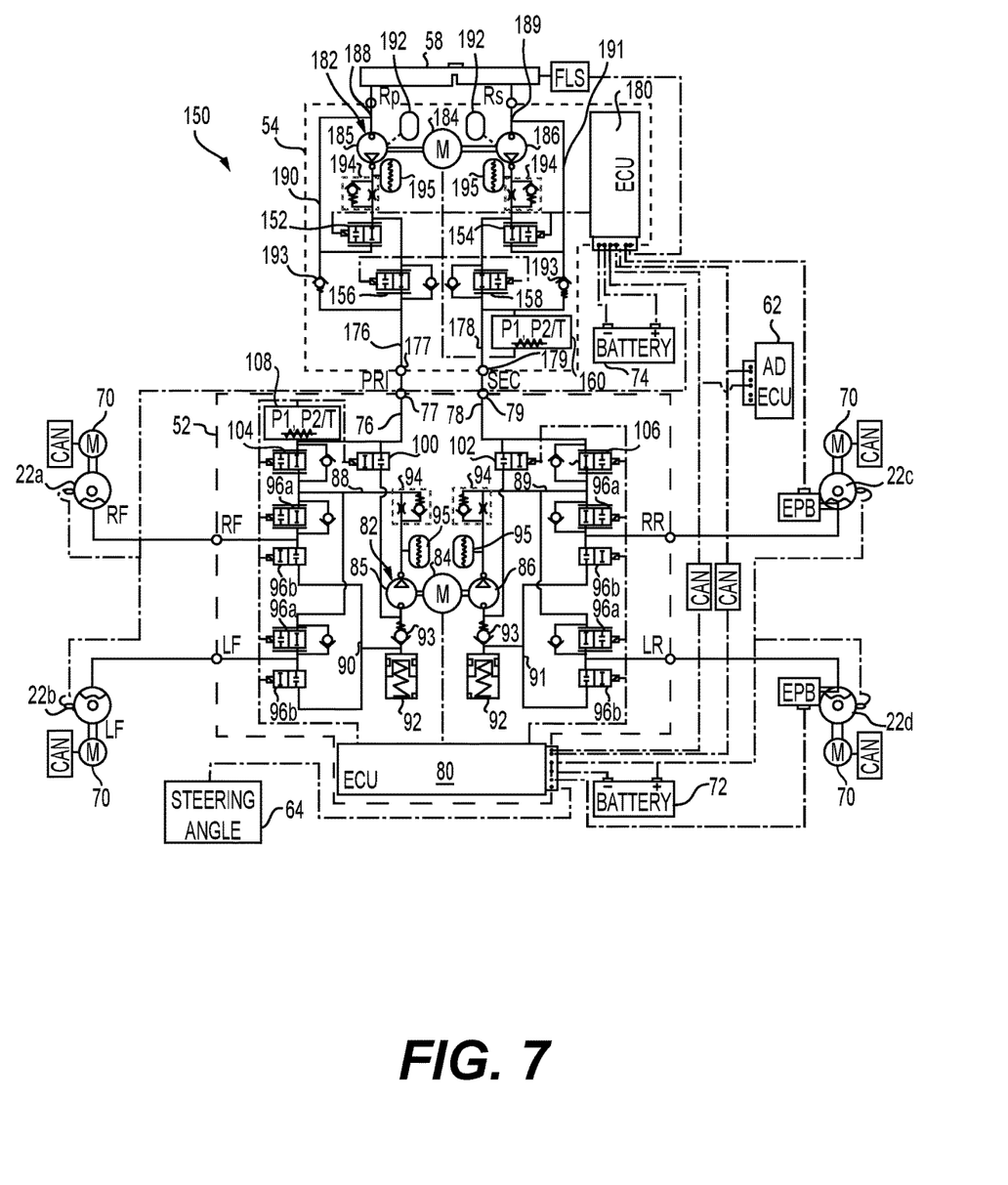
FIG. 7 shows a schematic diagram of a third brake system, according to an aspect of the present disclosure.

FIG. 7 shows a schematic diagram of a third brake system 150. The third brake system 150 may be similar or identical to the second brake system 50, but with the addition of isolation valves 156, 158 in the PSU module 54 to further improve flow control of the second pump 182. The isolation valves 156, 158 include a primary isolation valve 156 configured to control fluid flow between the outlet of the second primary pump element 185 and the second primary interconnect passage 176. The isolation valves 156, 158 also include a secondary isolation valve 158 configured to control fluid flow between the outlet of the second secondary pump element 186 and the second secondary interconnect passage 178. Each of the isolation valves 156, 158 may be a normally-open linear isolation valve that is capable of variable control of flow therethrough. The second brake ECU 180 may supply a control signal to each of the isolation valves 156, 158 to provide additional flow control.

According to an aspect of the disclosure, a brake system for motor vehicles is provided. The brake system can be activated in a normal brake-by-wire operating mode to slow the vehicle by an auto-pilot/autonomous driving device (AD ECU) controlling a primary electronic stability control assembly (ESC) and the same brake system in a fallback mode with a failed ESC assembly can be activated to slow the vehicle by an auto-pilot/autonomous driving device controlling a secondary pressure supply unit assembly PSU.

The present invention provides a brake system for a motor vehicle. The brake system comprises an electronic stability control (ESC) module defining a first interconnect passage, and a pressure supply unit (PSU) module defining a second interconnect passage in fluid communication with the first interconnect passage of the ESC module. The ESC module includes a first pump configured to transfer brake fluid from the PSU module and to a plurality of wheel brakes, and a prime valve configured to selectively control fluid communication between the first interconnect passage and an inlet of the first pump. The PSU module includes a second pump configured to transfer the brake fluid from a fluid reservoir to the first interconnect passage of the ESC module, and a bypass fluid passage with an inline check valve. The bypass fluid passage is configured to convey the brake fluid directly from the fluid reservoir to the ESC module and to bypass the second pump. The inline check valve is configured to allow fluid flow through the bypass fluid passage from the fluid reservoir and to the ESC module while blocking fluid flow in an opposite direction.

In some embodiments, each of the ESC module and the PSU module includes two separate and independent brake circuits, with each of the first pump and the second pump including a primary pump element and a secondary pump element for pumping brake fluid through a corresponding one of the brake circuits.

In some embodiments, the prime valve is a normally-closed solenoid valve.

In some embodiments, the ESC module further includes a supply fluid passage configured to convey the brake fluid from the first pump to at least one wheel brake of the plurality of wheel brakes, and at least one of an apply valve and a release valve for controlling fluid flow between the supply fluid passage and the at least one wheel brake.

In some embodiments, the ESC module further includes a pressure control valve configured to control a fluid flow between the first interconnect passage of the ESC module and the supply fluid passage for regulating a fluid pressure.

In some embodiments, the pressure control valve is a normally-open linear valve capable of variable control of flow therethrough.

In some embodiments, the PSU module further includes a pressure control valve controlling fluid flow between the second interconnect passage and the bypass fluid passage for regulating a fluid pressure.

In some embodiments, the pressure control valve is a normally-open linear isolation valve.

In some embodiments, the PSU module further includes an isolation valve controlling fluid flow between an outlet of the second pump and the second interconnect passage.

In some embodiments, the isolation valve is a normally-open linear valve capable of variable control of flow therethrough.

In some embodiments, each of the ESC module and the PSU module has an associated brake electronic control unit (ECU), with each of the brake ECUs being separate and independent, and each of the brake ECUs has a corresponding power supply, with the power supplies being separate and independent from one another.

The present invention also provides a brake system for a motor vehicle. The brake system comprises an electronic stability control (ESC) module defining a first interconnect passage, and a PSU module defining a second interconnect passage in fluid communication with the first interconnect passage of the ESC module. The ESC module includes a first electronic control unit (ECU) and a first pump configured to transfer brake fluid from the PSU module and to a plurality of wheel brakes. The PSU module includes a second ECU and a second pump configured to transfer the brake fluid from a fluid reservoir to the first interconnect passage of the ESC module, and a bypass fluid passage with an inline check valve. The bypass fluid passage is configured to convey the brake fluid directly from the fluid reservoir to the ESC module and bypassing the second pump. The inline check valve is configured to allow fluid flow through the bypass fluid passage from the fluid reservoir and to the ESC module while blocking fluid flow in an opposite direction.

In some embodiments, the brake system is configured to alternate applications of the plurality of wheel brakes between the ESC module and the PSU module.

In some embodiments, the ESC module further includes an isolation valve configured to selectively control fluid communication between the first interconnect passage and an inlet of the first pump.

In some embodiments, the isolation valve is a normally-open solenoid valve.

In some embodiments, the first ECU is configured to control operation of the first pump, and the second ECU is configured to control operation of the second pump, and the brake system further comprises an autonomous driving (AD) ECU in communication with each of the first ECU and the second ECU.

In some embodiments, the AD ECU is configured to utilize linearly controlled regenerative braking for braking events with the motor vehicle traveling greater a given speed.

In some embodiments, the AD ECU is configured to activate one of the first pump or the second pump to supply the brake fluid to the plurality of wheel brakes for braking events and with the motor vehicle traveling below a given speed.

In some embodiments, the AD ECU is configured to command the second ECU of the PSU module to supply the brake fluid to the plurality of wheel brakes for braking events and in response to a faulted condition being detected in the ESC module.

In some embodiments, at least one of the first ECU or the second ECU is configured to implement at least one of: an anti-lock braking system (ABS), autonomous emergency braking (AEB), and electronic stability control (ESC) based on at least one of a detected surface condition and a command from an autonomous driving (AD) ECU.

In some embodiments, to save manufacturing costs, the ESC module and the PSU module may be housed in identical appearing modules.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility.

What is claimed is:

1. A brake system for a motor vehicle, comprising:
   an electronic stability control (ESC) module defining a first interconnect passage, and a pressure supply unit (PSU) module defining a second interconnect passage in fluid communication with the first interconnect passage of the ESC module;
   the ESC module including a first pump configured to transfer brake fluid from the PSU module and to a plurality of wheel brakes, and a prime valve configured to selectively control fluid communication between the first interconnect passage and an inlet of the first pump;

the PSU module including a second pump configured to transfer the brake fluid from a fluid reservoir to the first interconnect passage of the ESC module, and a bypass fluid passage with an inline check valve;

wherein the bypass fluid passage is configured to convey the brake fluid directly from the fluid reservoir to the ESC module and bypassing the second pump; and wherein the inline check valve is configured to allow fluid flow through the bypass fluid passage from the fluid reservoir and to the ESC module while blocking fluid flow in an opposite direction, wherein each of the ESC module and the PSU module includes two separate and independent brake circuits, with each of the first pump and the second pump including a primary pump element and a secondary pump element for pumping brake fluid through a corresponding one of the brake circuits, wherein the second interconnect passage comprises a second primary interconnect passage and a second secondary interconnect passage and the bypass fluid passage comprises a primary bypass fluid passage configured to bypass a primary pump element of the second pump and a secondary bypass fluid passage configured to bypass a secondary pump element of the second pump, wherein the PSU module further includes a primary pressure control valve controlling fluid flow between the second primary interconnect passage and the primary bypass fluid passage for regulating a fluid pressure; and a secondary pressure control valve controlling fluid flow between the second secondary interconnect passage and the secondary bypass fluid passage for regulating a fluid pressure.

2. The brake system of claim 1, wherein the prime valve is a normally-closed solenoid valve.

3. The brake system of claim 1, wherein the ESC module further includes a supply fluid passage configured to convey the brake fluid from the first pump to at least one wheel brake of the plurality of wheel brakes, and at least one of an apply valve and a release valve for controlling fluid flow between the supply fluid passage and the at least one wheel brake.

4. The brake system of claim 3, wherein the ESC module further includes a pressure control valve configured to control a fluid flow between the first interconnect passage of the ESC module and the supply fluid passage for regulating a fluid pressure.

5. The brake system of claim 4, wherein the pressure control valve is a normally-open linear valve capable of variable control of flow therethrough.

6. The brake system of claim 1, wherein the primary pressure control valve and the secondary pressure control valve are a normally-open linear isolation valve.

7. The brake system of claim 1, wherein the PSU module further includes an isolation valve controlling fluid flow between an outlet of the second pump and the second interconnect passage.

8. The brake system of claim 7, wherein the isolation valve is a normally-open linear valve capable of variable control of flow therethrough.

9. The brake system of claim 1, wherein each of the ESC module and the PSU module has an associated brake electronic control unit (ECU), with each of the brake ECUs being separate and independent, and wherein each of the brake ECUs has a corresponding power supply, with the power supplies being separate and independent from one another.

10. A brake system for a motor vehicle, comprising:

an electronic stability control (ESC) module defining a first interconnect passage, and a pressure supply unit (PSU) module defining a second interconnect passage in fluid communication with the first interconnect passage of the ESC module;

the ESC module including a first electronic control unit (ECU) and a first pump configured to transfer brake fluid from the PSU module and to a plurality of wheel brakes;

the PSU module including a second ECU and a second pump configured to transfer the brake fluid from a fluid reservoir to the first interconnect passage of the ESC module, and a bypass fluid passage with an inline check valve;

wherein the bypass fluid passage is configured to convey the brake fluid directly from the fluid reservoir to the ESC module and bypassing the second pump; and wherein the inline check valve is configured to allow fluid flow through the bypass fluid passage from the fluid reservoir and to the ESC module while blocking fluid flow in an opposite direction, wherein each of the ESC module and the PSU module includes two separate and independent brake circuits, with each of the first pump and the second pump including a primary pump element and a secondary pump element for pumping brake fluid through a corresponding one of the brake circuits, wherein the second interconnect passage comprises a second primary interconnect passage and a second secondary interconnect passage and the bypass fluid passage comprises a primary bypass fluid passage configured to bypass a primary pump element of the second pump and a secondary bypass fluid passage configured to bypass a secondary pump element of the second pump, wherein the PSU module further includes a primary pressure control valve controlling fluid flow between the second primary interconnect passage and the primary bypass fluid passage for regulating a fluid pressure; and a secondary pressure control valve controlling fluid flow between the second secondary interconnect passage and the secondary bypass fluid passage for regulating a fluid pressure.

11. The brake system of claim 10, wherein the brake system is configured to alternate applications of the plurality of wheel brakes between the ESC module and the PSU module.

12. The brake system of claim 10, wherein the ESC module further includes an isolation valve configured to selectively control fluid communication between the first interconnect passage and an inlet of the first pump.

13. The brake system of claim 12, wherein the isolation valve is a normally-open solenoid valve.

14. The brake system of claim 10, wherein the first ECU is configured to control operation of the first pump, and the second ECU is configured to control operation of the second pump, and wherein the brake system further comprises an autonomous driving (AD) ECU in communication with each of the first ECU and the second ECU.

15. The brake system of claim 14, wherein the AD ECU is configured to utilize linearly controlled regenerative braking for braking events with the motor vehicle traveling greater a given speed.

16. The brake system of claim 14, wherein the AD ECU is configured to activate one of the first pump or the second pump to supply the brake fluid to the plurality of wheel brakes for braking events and with the motor vehicle traveling below a given speed.

17. The brake system of claim 14, wherein the AD ECU is configured to command the second ECU of the PSU module to supply the brake fluid to the plurality of wheel brakes for braking events and in response to a faulted condition being detected in the ESC module.

18. The brake system of claim 10, wherein at least one of the first ECU or the second ECU is configured to implement at least one of: an anti-lock braking system (ABS), dynamic rear pressure (DRP) control of front-to-rear brake balance, autonomous emergency braking (AEB), and electronic stability control (ESC) based on at least one of a detected surface condition and a command from an autonomous driving (AD) ECU.

\* \* \* \* \*